(12) United States Patent
Li et al.

(10) Patent No.: US 12,488,576 B2
(45) Date of Patent: Dec. 2, 2025

(54) HIERARCHICAL CONTEXT IN RISK ASSESSMENT USING MACHINE LEARNING

(71) Applicant: X Development LLC, Mountain View, CA (US)

(72) Inventors: Xin Li, Santa Clara, CA (US); Akshina Gupta, Warren, NJ (US); Nishanth Singaraju, Waxhaw, NC (US); Eliot Julien Cowan, Atherton, CA (US); Avery Noam Cowan, Atherton, CA (US)

(73) Assignee: X Development LLC, Mountain View, CA (US)

( * ) Notice: Subject to any disclaimer, the term of this patent is extended or adjusted under 35 U.S.C. 154(b) by 421 days.

(21) Appl. No.: 18/075,538

(22) Filed: Dec. 6, 2022

(65) Prior Publication Data

US 2023/0177816 A1    Jun. 8, 2023

Related U.S. Application Data

(60) Provisional application No. 63/265,051, filed on Dec. 7, 2021.

(51) Int. Cl.
*G06V 10/80* (2022.01)
*G06V 20/00* (2022.01)

(52) U.S. Cl.
CPC .......... *G06V 10/806* (2022.01); *G06V 20/38* (2022.01)

(58) Field of Classification Search
None
See application file for complete search history.

(56) References Cited

U.S. PATENT DOCUMENTS

| 10,970,923 B1* | 4/2021 | Nussbaum | G06N 3/006 |
| 2014/0132409 A1* | 5/2014 | Billman | G08B 19/00 |
| | | | 463/31 |

(Continued)

FOREIGN PATENT DOCUMENTS

| CN | 112966926 | 6/2021 |
| CN | 113361968 | 9/2021 |
| CN | 113421007 | 9/2021 |

OTHER PUBLICATIONS

Nia, "Automatic Building Damage Assessment Using Deep Learning and Ground-Level Image Data," Simon Fraser University, MS Thesis, 2017 (Year: 2017) pdf available at https://summit.sfu.ca/item/16986.*

(Continued)

*Primary Examiner* — Soo Shin
(74) *Attorney, Agent, or Firm* — Fish & Richardson P.C.

(57) ABSTRACT

Methods, systems, and apparatus for receiving a request for a risk assessment for a parcel, receiving a set of images for the parcel, the set of images including two or more images, each image having an image scale and an image resolution that is different from other images in the set of images, providing a first-level feature embedding and a second-level feature embedding, the first-level feature embedding being provided by processing a first-level image through a first-level machine learning (ML) model, and the second-level feature embedding being provided by processing a second-level image through a second-level ML model, determining a risk assessment at least partially by processing each of the first-level feature embedding and a second-level feature embedding through a fusion network, and providing a representation of the risk assessment for display.

30 Claims, 4 Drawing Sheets

(56) References Cited

U.S. PATENT DOCUMENTS

| | | | | |
|---|---|---|---|---|
| 2018/0089763 A1* | 3/2018 | Okazaki | ............... | G06N 3/045 |
| 2020/0193340 A1* | 6/2020 | Yoon | ..................... | G06N 20/00 |
| 2020/0234447 A1* | 7/2020 | Karmatha | ............. | G06V 10/82 |
| 2022/0237764 A1* | 7/2022 | Mullet | .................. | G06Q 50/16 |
| 2025/0103361 A1* | 3/2025 | Singh | .................. | G06V 10/761 |
| 2025/0103722 A1* | 3/2025 | Mccann | ................. | G06F 40/40 |

OTHER PUBLICATIONS

Nia, "Automatic Building Damage Assessment Using Deep Learning and Ground-Level Image Data," Simon Fraser University, MS Thesis, 2017 pdf available at https://summit.sfu.ca/item/16986 (Year: 2017).*

Lin et al., "Feature Pyramid Networks for Object Detection," CoRR, Dec. 9, 2016, arxiv.org/abs/1612.03144, 10 pages.

Notice of Acceptance in Australian Appln. No. 2022283648, dated Jul. 17, 2024, 5 pages.

Office Action in Australian Appln. No. 2022283648, dated Aug. 24, 2023, 6 pages.

\* cited by examiner

HIERARCHICAL CONTEXT IN RISK ASSESSMENT USING MACHINE LEARNING

CROSS-REFERENCE TO RELATED APPLICATIONS

This application claims the benefit of U.S. Prov. App. No. 63/265,051, filed on Dec. 7, 2021, the disclosure of which is expressly incorporated herein by reference in the entirety.

TECHNICAL FIELD

This specification relates generally to geospatial predictions of risk, and more specifically to providing hierarchical context in risk assessments using machine learning.

BACKGROUND

Adverse events, such as natural disasters are increasing in both frequency and intensity. Example natural disasters can include wildfires, hurricanes, tornados, and floods, among several others. Natural disasters often result in significant loss that can include a spectrum of economic losses, property losses, and physical losses (e.g., deaths, injuries). Consequently, significant time and effort is expended not only predicting occurrences of natural disasters, but characteristics of natural disasters such as duration, severity, spread, and the like. Technologies, such as machine learning (ML), have been leveraged to generate predictions around natural disasters. However, natural disasters present a special use case for predictions using ML models, which results in technical problems that must be addressed to generate reliable and actionable predictions.

SUMMARY

This specification describes systems, methods, devices, and other techniques relating to using machine learning (ML) models in a risk assessment system. More particularly, innovative aspects of the subject matter described in this specification relate to a ML system that includes multiple ML models to predict risk based on respective image scales and image resolutions, each ML model providing a feature embedding. Each feature embedding encodes a spatial context and resolution of a respective image scale. The feature embeddings are provided as input to a fusion network, which processes the feature embeddings to provide a risk assessment. In some examples, the risk assessment is provided as a score that represents a likelihood of occurrence of an adverse event.

In general, innovative aspects of the subject matter described in this specification can include actions of receiving a request for a risk assessment for a parcel, receiving a set of images for the parcel, the set of images including two or more images, each image having an image scale and an image resolution that is different from other images in the set of images, providing a first-level feature embedding and a second-level feature embedding, the first-level feature embedding being provided by processing a first-level image through a first-level machine learning (ML) model, and the second-level feature embedding being provided by processing a second-level image through a second-level ML model, determining a risk assessment at least partially by processing each of the first-level feature embedding and a second-level feature embedding through a fusion network, and providing a representation of the risk assessment for display. Other implementations of this aspect include corresponding systems, apparatus, and computer programs, configured to perform the actions of the methods, encoded on computer storage devices.

These and other implementations can each optionally include one or more of the following features: the first-level feature embedding includes a parcel-level feature embedding that is generated at least partially based on a parcel-level image in the set of images, and the second-level feature embedding includes one of a neighborhood-level feature embedding that is generated at least partially based on a neighborhood-level image in the set of images and a landscape-level feature embedding that is generated at least partially based on a landscape-level image in the set of images; the parcel-level image has an image scale and an image resolution that are greater than an image scale and the image resolution of each of the neighborhood-level image and the landscape-level image; each image in the set of images represents the parcel within a threshold of time from a designated time associated with the request; at least one image in the set of images includes an overhead view of the parcel and at least one other image in the set of images includes one of a vegetation segmentation map and an elevation map; actions further include providing a third-level feature embedding by processing a third-level image through a third-level ML model, wherein the third-level feature embedding is processed through the fusion network in determining the risk assessment; determining the risk assessment includes converting a relative risk prediction to the risk assessment using a calibration curve; the relative risk prediction is output by a last layer of the fusion network; the first-level feature embedding is output from a non-final layer of the first-level ML model and the second-level feature embedding is output from a non-final layer of the second-level ML model; and the first-level feature embedding is further provided by processing a set of first-level pixel data through the first-level ML model, and the second-level feature embedding is further provided by processing a set of second-level pixel data through the second-level ML model.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are directed to using machine learning (ML) models in a risk assessment system. More particularly, innovative aspects of the subject matter described in this specification relate to a ML system that includes multiple ML models to predict risk based on respective image scales and image resolutions, each ML model providing a feature embedding. Each feature embedding encodes a spatial context and resolution of a respective image scale. The feature embeddings are provided as input to a fusion network, which processes the feature embeddings to provide a risk assessment. In some examples, the risk assessment is provided as a score that represents a likelihood of occurrence of an adverse event. In some implementations, geospatial predictions of risk (e.g., risk assessments) provided by the ML system of the present disclosure can be used when determining a course of action. For example, one or more preemptive mitigation actions can be determined and performed to reduce the likelihood that the adverse event will occur.

For purposes of illustration, implementations of the present disclosure are described in further detail herein with reference to an example risk assessment in view of an example adverse event. The example risk assessment includes a risk to a parcel that can include real property and one or more assets located thereon (e.g., home, building). This is generally referred to herein as property risk or parcel risk. An example adverse event includes wildfire. For example, and using the illustrative examples, a property risk (risk assessment) is provided as a score that represents a likelihood of a parcel being damaged by a wildfire. It is contemplated, however, that implementations of the present disclosure can be realized using any appropriate asset and any appropriate adverse event.

To provide context for implementations of the present disclosure, systems have been developed to assess property risk in an automated or semi-automated manner. For example, risk assessment systems have been developed that can process images of parcels using a ML model to determine risk assessments. However, property risk can come from various aspects at multiple scales. For example, objects (e.g., buildings, brush, trees, forests, waterways, lakes) can influence risk to a parcel. At the same time, objects span different scales. For example, a shed, vegetation, and/or stack of firewood located on a parcel is at a much smaller scale than a forest or lake located near the parcel. Recognizing objects at different scales is a fundamental challenge in computer vision.

As a result, some traditional risk assessment systems use techniques such as feature pyramids, which can be described as scale-invariant. This means that a scale change of an object is offset by shifting a level of the object within a feature pyramid. This enables a ML model to detect objects across a range of scales by inputting positions and pyramid levels to the ML model. However, pyramid features are processor- and memory-intensive in both training and inference. While development in pyramid features has provided some improvements, the improvements have been marginal and/or come with other technical costs.

In view of this, and as introduced above, implementations of the present disclosure provide a ML system that includes multiple ML models and a fusion network to predict risk to a parcel over a hierarchy of image scales and image resolutions. In some examples, image scale (also referred to as map scale) indicates a relative difference in size (or distance) between the image and real-world features actually depicted in the image. In some examples, image scale is provided as a ratio (also referred to as fractional scale) of image distance to ground distance. For example, an image scale of 1:100,000 indicates that 1 cm on the image equals 100,000 cm (1 km) in the real-world entity (e.g., ground) captured in the image. Accordingly, image scale represents the relative size of real-world features depicted in images. In some examples, image resolution (also referred to as spatial resolution) is an indication of the size of a pixel of an image in terms of dimensions of real-world features (e.g., ground). Image resolution can be provided as a single value that indicates the length of a side of a square. For example, an image resolution of 30 m indicates that one pixel represents an area of 30 m×30 m (900 m$^2$) on the ground.

In some examples, data density can be represented as a number of data points for an area within a geospatial region. For example, for a two-dimensional image of a geospatial region, a data density can be provided as a number of data points per m$^2$. A high data density indicates that there are relatively more data points per unit area of a geospatial region than a low data density. Different data densities can be appropriate for different metrics. For example, lower density data layers can allow an ML model to learn characteristics of wildfires that are likely to reach a region, such as elevation or previous prescribed burns. Higher density data can help the ML model learn finer-grained information about a region, for example, that the upwind direction of a region (e.g., a neighborhood) had a prescribed burn last year.

As noted above, property risk can come from various aspects at multiple scales. At a granular level (e.g., parcel context), property risk can depend on risk factors such as materials that an asset located on a parcel is constructed from, as well as objects located on the parcel (e.g., vegetation) and spatial arrangement and/or density of objects. For example, property risk can depend on roof material (e.g., thatched, shingle, tile, metal) and structural material (e.g., wood, brick, cement). These types of risk factors can be identified with relatively smaller spatial context (e.g., parcel-level), but it requires relatively high-resolution imagery (e.g., 10 cm-5 m per pixel).

At a less granular level (e.g., neighborhood context), property risk can depend on risk factors such as materials of other assets and/or other features in a neighborhood of the asset. A neighborhood of a property can include, for example, a radius of X (e.g., 50 m) around the parcel, or a rectangle of Y by Z (e.g., 50 m×50 m) around the parcel. This can include, for example, assets and/or objects located on neighboring parcels, as well as vegetation, roadways, water features, and the like lying within the neighborhood. This can also include spatial arrangement and/or density of objects and/or other features located on neighboring parcels. These types of risk factors can be identified within some spatial context (e.g., neighborhood-level) and requires more moderate resolution imagery (e.g., 10 m-30 m per pixel).

At a more abstract level (e.g., landscape-level), property risk can depend on risk factors of the landscape. This can include, for example, elevation (e.g., whether the property sits on a slope), vegetation (e.g., whether the property is close to forests, whether there are prescribed burns in the area), and water bodies (e.g., nearby lakes, rivers, reservoirs). This information helps to inform on characteristics of wildfires that are likely to affect likelihood of damage to the parcel. These types of risk factors can be identified with more spatial context (e.g., landscape context) within the broader landscape surrounding the parcel. For example, a landscape for the parcel can encompass a radius of Q (e.g., 5 kilometers (km)) around the property, or a rectangle of R by S (e.g., 5 km×5 km) around the property. Here, relatively low-resolution imagery is used (e.g., ≥60 m per pixel).

In accordance with implementations of the present disclosure, each ML model of the ML system is associated with a respective image scale and image resolution. In some implementations, a parcel-level ML model processes parcel-level images having a relatively large image scale (e.g., 1:50-1:500, measured in cm) and a relatively high image resolution (e.g., 10 cm-5 m per pixel), a neighborhood-level ML model processes neighborhood-level images having a relatively moderate image scale (e.g., 1:1500-1:2500, measured in cm) and a relatively medium image resolution (e.g., 10 m-30 m per pixel), and a landscape-level ML model processes landscape-level images having a relatively small image scale (e.g., 1:10,000-1:30,000, measured in cm) and a relatively low image resolution (e.g., ≥60 m per pixel). In some examples, the parcel-level ML model provides a parcel-level embedding that encodes a spatial context and resolution of a parcel-level image, the neighborhood-level ML model provides a neighborhood-level embedding that encodes a spatial context and resolution of a neighborhood-level image, and the landscape-level ML model provides a landscape-level embedding that encodes a spatial context and resolution of a landscape-level image. Each of the feature embeddings is provided as a multi-dimensional vector.

It can be noted that disparate resolution levels provide technical advantages. For example, for lower resolutions, the respective ML models can have relatively high accuracies for their respective contexts, because there is less noise in feature sets that are represented in images of decreasing resolution. Further, smaller-sized datasets can be used for training the ML models that process lower resolution images. In this manner, technical improvements are achieved in terms of processors and memory expended during training, while enabling the disparate contexts to contribute to assessing property risk.

In some examples, the feature embeddings include the same number of dimensions. In some examples, the feature embeddings include different numbers of dimensions. In some examples, the parcel-level embedding is provided as a multi-dimensional vector that encodes features at the parcel-level (e.g., buildings on a parcel, materials building is made from, features in yard). In some examples, the neighborhood-level embedding is provided as a multi-dimensional vector that encodes features at the neighborhood-level (e.g., materials surrounding buildings are made from, features in yards of surrounding buildings, features between yards). In some examples, the landscape-level embedding is provided as a multi-dimensional vector that encodes features at the landscape-level (e.g., roadways, rivers, lakes, reservoirs, forests in broader surrounding area).

In accordance with implementations of the present disclosure, the parcel-level embedding, the neighborhood-level embedding, and the landscape-level embedding are provided as input to the fusion network. The fusion network processes the parcel-level embedding, the neighborhood-level embedding, and the landscape-level embedding to provide a risk assessment. In the non-limiting example of the present disclosure, the risk assessment is provided as a score that represents a likelihood of the property being damaged by a wildfire (e.g., burnt). In some implementations, risk assessments provided by the ML system of the present disclosure can be used when determining a course of action. For example, one or more preemptive mitigation actions can be determined and performed to reduce the likelihood that the property will be damaged by wildfire. Example mitigations can include, without limitation, brush clearing, vegetation thinning, and the like.

To provide further context for the subject matter of the present disclosure, and as introduced above, ML has been leveraged to generate predictions around geospatial contexts. For example, ML models can be used to generate predictions representative of characteristics of a natural disaster, such as likelihood of occurrence, duration, severity, spread, among other characteristics, of the natural disaster. The non-limiting example natural disaster used to illustrate implementations of the present disclosure includes wildfires.

In general, ML models can be trained to predict characteristics of a natural disaster using training data that is representative of characteristics of occurrences of the natural disaster, for example. Example types of ML models can include Gradient Boosted Decision Trees (GBDTs), Convolutional Neural Networks (CNNs), Residual Neural Networks (RNNs), and Generative Adversarial Networks (GANs). In general, the training data can include region data representative of properties of respective regions (e.g., geographical areas), at which the natural disaster has occurred. In some examples, each ML model predicts a respective characteristic of the natural disaster. Example ML models can include, without limitation, risk models that predict a likelihood of occurrence of the natural disaster. Other example ML models can include spread models that predict rates of spread of the natural disaster, if occurring, spread models that predict spreads of the natural disaster in the region, if occurring, and intensity models that predict an intensity of the natural disaster, if occurring. Characteristics of a natural disaster can be temporal. For example, a risk of wildfire is higher during a dry season than during a rainy season. Consequently, each ML model can be temporal. That is, for example, each ML model can be trained using training data representative of a particular period of time. In addition, because the layers of training data all relate to the same region and contain measurements made at or around the same time, a single ML model can learn temporal properties from the training data.

In further detail, the region data can include an image of the region and a set of properties of the region (e.g., provided in a set of pixel-level data). More generally, the region data can be described as a set of data layers (e.g., N data layers), each data layer providing a respective type of data representative of a property of the region. In some examples, the data layers can number in the tens of data layers to hundreds of data layers. In some examples, each data layer includes an array of pixels, each pixel representing a portion of the region and having data associated therewith that is representative of the portion of the region. A pixel can represent a portion as an area (e.g., $cm^2$, $m^2$, $km^2$) within the region. The area that a pixel represents in one data layer can be different from the area that a pixel represents in another data layer. For example, each pixel within a first data layer can represent X $km^2$ and each pixel within a second data layer can represent Y $km^2$, where X≠Y.

An example data layer can include an image layer, in which each pixel is associated with image data, such as red, green, blue (RGB) values (e.g., each value ranging from 0 to 255). Another example layer can include a vegetation layer, in which, for each pixel, a normalized vegetation difference index (NVDI) value (e.g., in range of [−1, 1], lower values indicating absence of vegetation). Other example layers can include, without limitation, a temperature layer, in which a temperature value is assigned to each pixel, a humidity layer, in which a humidity value is assigned to each pixel, a wind layer, in which wind-related values (e.g., speed, direction) are assigned to each pixel, a barometric pressure layer, in which a barometric pressure value is assigned to each pixel, a precipitation layer, in which a precipitation value is assigned to each pixel, and an elevation layer, in which an elevation value is assigned to each pixel.

In general, data values for pixels of data layers can be obtained from various data sources including data sources provided by, for example, governmental entities, non-governmental entities, public institutions, and private enterprises. For example, data can be obtained from databases maintained by the National Weather Service (NWS), the United States Fire Service (USFS), and the California Department of Forestry and Fire Protection (CAL FIRE), among many other entities. For example, weather-related data for a region can be obtained from a web-accessible database (e.g., through a hypertext transfer protocol (HTTP), calls to an application programming interface (API)). In another example, data stored in a relational database can be retrieved through queries to the database (e.g., structured query language (SQL) queries).

Because values across the data layers can change over time, the region data can be temporal. For example, temperature values for the region can be significantly different in summer as compared to winter. Therefore, a data layer represents a characteristic of the region at a particular time point, and multiple data layers can represent the same characteristic in the same region, but at different time points.

Accordingly, the region data can include an array of N data layers (e.g., $[1_1, 1_2, \ldots, 1_N]$). Each layer, $1_i$, can include an array of pixels, $[p_{1,1}, p_{i,j}]$, where each pixel contains a value for a property (e.g., vegetation, humidity, wind speed, etc.) at a point in space. Each layer can also include metadata describing the layer. For example, the metadata, M, can include the time T at which the characteristic was measures, points indicating the boundaries of the region, and the size of a pixel: $[T, (x_1, y_1), (x_2, y_2), S]$, where T is the measurement time, $(x_1, y_1)$ and $(x_2, y_2)$ demarcate the region boundary, and S indicates the size of the pixel (e.g., m²). Therefore, a full representation of a layer k can be represented as $1_k=[p_{1,1}, \ldots, p_{i,j}, M]$.

As training data, the region data, which can be referred to as region training data in the context of training, can include one or more characteristic layers that provides known characteristic data for respective characteristics of a natural disaster. The known characteristic data represents actual values of the respective characteristics prior to occurrence of the natural disaster and as a result of the natural disaster. For example, a wildfire can occur within a region and, as a result, characteristics of intensity, spread, duration, and the like can be determined for the natural disaster. Accordingly, as training data, the region data can include, for example, $p_{i,j}=[1_1, 1_2, \ldots, C_{A,i,j}^K, C_{B,i,j}^K, \ldots]$, where $1_i$ are data layers and $C_{A,i,j}^K$ and $C_{A,i,j}^K$ are respective known (K) characteristics (i.e., historical characteristics) of a natural disaster of a particular type (A) in question, where types of natural disasters can include wildfires, floods, hurricanes, etc.

As noted above, ML models are trained using the training data. The training process can depend on a type of the ML model. In general, the ML model is iteratively trained, where, during an iteration, also referred to as epoch, one or more parameters of the ML model are adjusted, and an output (e.g., predicted characteristic value) is generated based on the training data. For each iteration, a loss value is determined based on a loss function. The loss value represents a degree of inaccuracy of the output of the ML model as compared to a desired or known value (e.g., known characteristic). The loss value can be described as a representation of a degree of difference between the output of the ML model and the desired output, of the ML model for a particular example. The desired output for a training example can be included in the training example. Examples of loss functions can include mean squared error (MSE) and log loss.

In some examples, if the loss value does not meet an expected value (e.g., is not equal to zero), parameters of the ML model are adjusted (e.g., using backpropagation) in another iteration (epoch) of training. In some examples, the iterative training continues for a pre-defined number of iterations (epochs). In some examples, the iterative training continues until the loss value meets the expected value or is within a threshold range of the expected value.

To generate predictions, layers of region data representative of a region, for which predictions are to be generated, are provided as input to a (trained) ML model, which generates a predicted characteristic for each pixel within the region data. An example output of the ML model can include $p_{i,j}=[C_{i,j}^P]$, where C is a characteristic predicted (P) by the ML model. In some implementations, a model can make multiple predictions. For example, if the model makes k predictions, the output can be a vector of predictions, $[p_{1,i,j}, p_{2,i,j}, \ldots, p_{k,i,j}]$. Example characteristics can include, without limitation, likelihood of occurrence (e.g., risk), a rate of spread, an intensity, and a duration. In some examples, an image of the region can be displayed to visually depict the predicted characteristic across the region. For example, different values of the characteristic can be associated with respective visual cues (e.g., colors, shades of colors), and the predicted characteristic can be visually displayed as a heatmap over an image of the region.

Figure 1:
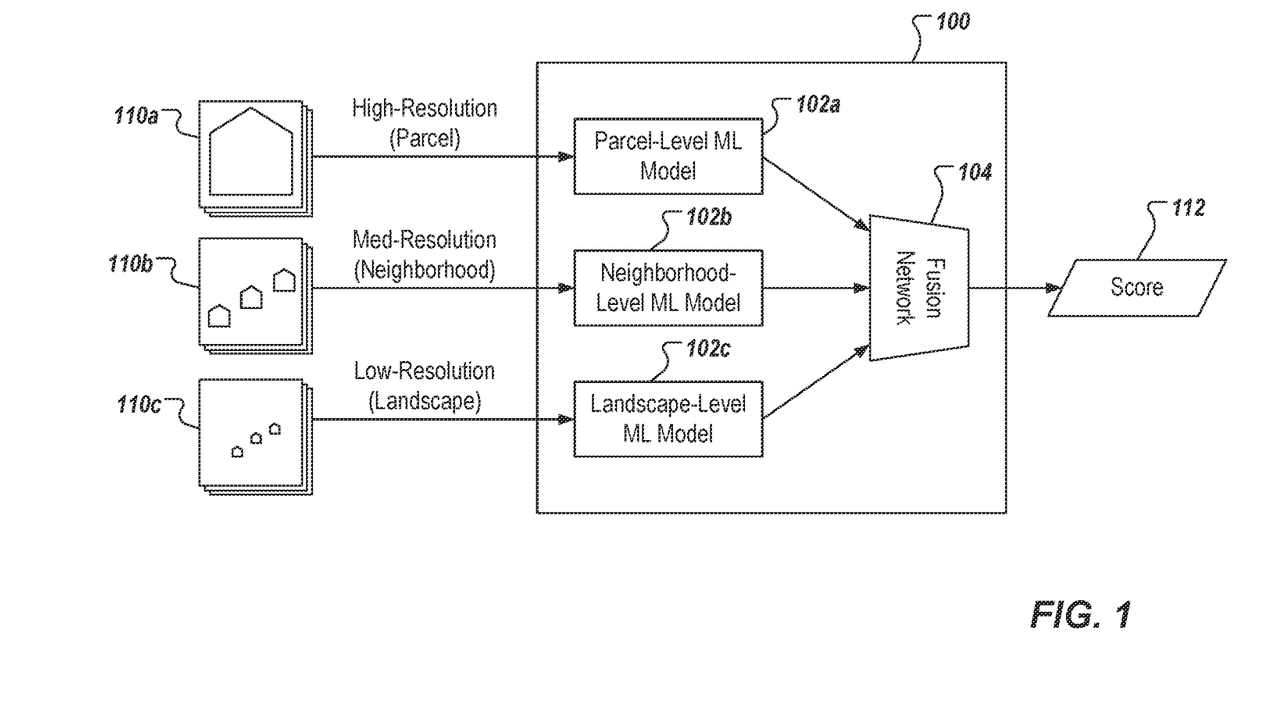
FIG. 1 illustrates a risk assessment system in accordance with implementations of the present disclosure.

FIG. 1 illustrates a risk assessment system 100 in accordance with implementations of the present disclosure. In the example of FIG. 1, the risk assessment system 100 includes a parcel-level ML model 102a, a risk-level ML model 102b, a landscape-level ML model 102c, and a fusion network 104. As described in further detail herein, the parcel-level ML model 102a processes parcel-level images 110a having a relatively small image scale (e.g., 1:50-1:500, measured in cm) and a relatively high image resolution (e.g., 10 cm-5 m per pixel), the neighborhood-level ML model 102b processes neighborhood-level images having a relatively moderate image scale (e.g., 1:1500-1:2500, measured in cm) and a relatively moderate image resolution (e.g., 10 m-30 m per pixel), and the landscape-level ML model 102c processes landscape-level images having a relatively large image scale (e.g., 1:10,000-1:30,000, measured in cm) and a relatively low image resolution (e.g., ≥60 m per pixel). In some examples, the parcel-level ML model 102a provides a parcel-level embedding that encodes a spatial context and resolution of a parcel-level image 110a, the neighborhood-level ML model 102b provides a neighborhood-level embedding that encodes a spatial context and resolution of a neighborhood-level image 110b, and the landscape-level ML model 102c provides a landscape-level embedding that encodes a spatial context and resolution of a landscape-level image 110c.

In some examples, the parcel-level embedding, the neighborhood-level embedding, and the landscape-level embedding are provided as input to the fusion network 104. The fusion network 104 processes the parcel-level embedding, the neighborhood-level embedding, and the landscape-level embedding to provide a risk assessment, represented by a score 112. In the non-limiting example of the present disclosure, the risk assessment is provided as the score, which represents a likelihood of a parcel being damaged by a wildfire. For example, and as described in further detail herein, the parcel-level image 110a depicts the parcel, and data representative of the parcel itself, the neighborhood-level image 110b depicts the parcel and a neighborhood around the parcel, and data representative of the neighborhood, and the landscape-level image 110c depicts the parcel and a landscape around the parcel, and data representative of the landscape. As also described in further detail herein, the parcel-level image 110a is at a first image scale and a first image resolution, the neighborhood-level image 110b is at a second image scale and a second image resolution, and the landscape-level image 110c is at a third image scale and a third image resolution. The first image scale is larger (more detail) than the second image scale, and the second image scale is higher (more detail) than the third image scale. The first image resolution being higher (more granular) than the second image resolution, and the second image resolution being higher (more granular) than the third image resolution.

In some examples, the parcel-level image 110a can be provided as a street-view image. In general, a street-view image of a parcel can result in access to unique features of a parcel that are not otherwise available using other imaging data. Such features can include, for example, features that reflect a current state of a parcel (e.g., vines growing on a side of a house, location of cars parked in a driveway). In some examples, a street-view image can be generated by a device local to the parcel (e.g., a smartphone, a camera). For example, a user that requests a risk assessment for a parcel can capture a street-view image of the parcel using a smartphone.

In some examples, the parcel-level image 110a, the neighborhood-level image 110b, and the landscape-level image 110c can each be provided as overhead images (e.g., aerial image, satellite image). In some examples, overhead images include any images capturing a geographical region and providing information for the geographical region. Information for the geographical region can include, for example, information (e.g., structures, vegetation, terrain, weather) about one or more parcels (e.g., including structures) located in the geographical region. Overhead images can be, for example, Landsat images, or other appropriate forms of overhead imagery. The overhead images can be, for example, RGB images or hyperspectral images. Overhead images can be captured using satellite technology (e.g., Landsat) or drone technology. In some implementations, overhead images can be captured using any appropriate high-altitude technology (e.g., drones, weather balloons, planes). In some examples, synthetic aperture radar (SAR) images can be utilized.

In some implementations, overhead images may be captured utilizing radar-based imaging, for example, LIDAR images, RADAR images, or another type of imaging using the electromagnetic spectrum, or a combination thereof. Overhead images can include images of geographic regions including various natural features including different terrains, vegetation, bodies of water, and other features. Satellite/aerial images can include images of man-made developments (e.g., housing construction, roads, dams, retaining walls).

In some implementations, the parcel-level ML model 102a, the risk-level ML model 102b, the landscape-level ML model 102c are each provided as a respective CNN. In some examples, the parcel-level ML model 102a, the risk-level ML model 102b, the landscape-level ML model 102c output respective feature embeddings from a non-final layer. In some implementations, the fusion network 104 is provided as a CNN that outputs the score 112 from a final layer. In some examples, the final layer can include a sigmoid activation function that outputs a binary prediction (e.g., 0, 1) as a classification problem (e.g., 0 indicates no damage, 1 indicates damage). In some examples, a calibration curve can be fit to a test set and/or validation set of the fusion network 104 during post-training testing and validation. The calibration curve can be used during inference to convert a relative risk prediction output by the last layer of the fusion network 102 into a probability that represents an actual probability of damage.

In some implementations, the parcel-level ML model 102a, the risk-level ML model 102b, the landscape-level ML model 102c, and the fusion network 104 are trained during a training phase using a set of training data. In some examples, the set of training data includes sets of images associated with respective parcels and one or more labels for the parcels. In some examples, the one or more labels represent ground truths in terms of risk for the property represented in a set of images. For example, a set of images can include a parcel-level image and associated parcel-level data, a neighborhood-level image and associated neighborhood-level data, and a landscape-level image and associated landscape-level data for a property, and a label can indicate whether the property represented in the set of images suffered damage from a wildfire. For example, the label can be provided as a set of ground truth images that depict a burn scar resulting from a wildfire at each of the parcel-level, the neighborhood-level, and the landscape-level, respectively. In some examples, the associated data includes pixel-level values for a property of features depicted in the image (e.g., vegetation, humidity, wind speed, weather, structure, material, elevation, slope).

Further detail on training data and generating training data is described in commonly assigned U.S. application Ser. No. 17/158,585, filed on Jan. 26, 2021, which is expressly incorporated herein by reference in the entirety for all purposes.

During training, each set of images and associated data are provided as input to the risk assessment system 100 and a respective score is determined. Loss is determined based on the scores and parcels of each of the parcel-level ML model 102a, the risk-level ML model 102b, the landscape-level ML model 102c, and the fusion network 104 are iteratively updated (e.g., using backpropagation) until the loss achieves a value (e.g., is minimized). After training, during an inference phase, sets of images representative of parcels are input to the risk assessment system 100 to provide scores 112 for respective parcels. Each score 112 represents a risk assessment for a respective parcel in terms of likelihood that the parcel will be damaged by a wildfire (e.g., be burnt in a wildfire).

Figure 2A:
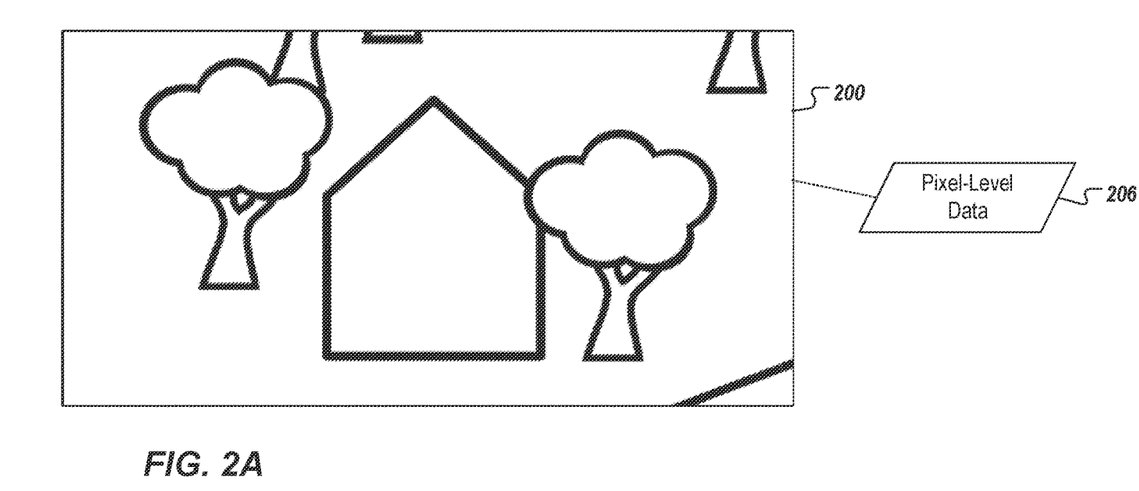
FIGS. 2A-2C depict images of an example property in accordance with implementations of the present disclosure.
Figure 2B:
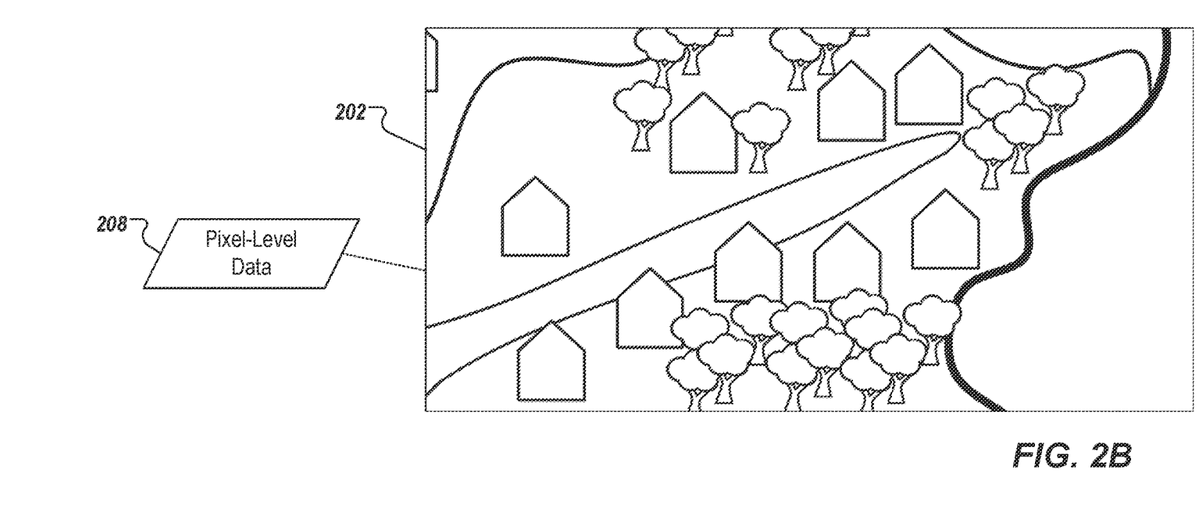
Figure 2C:
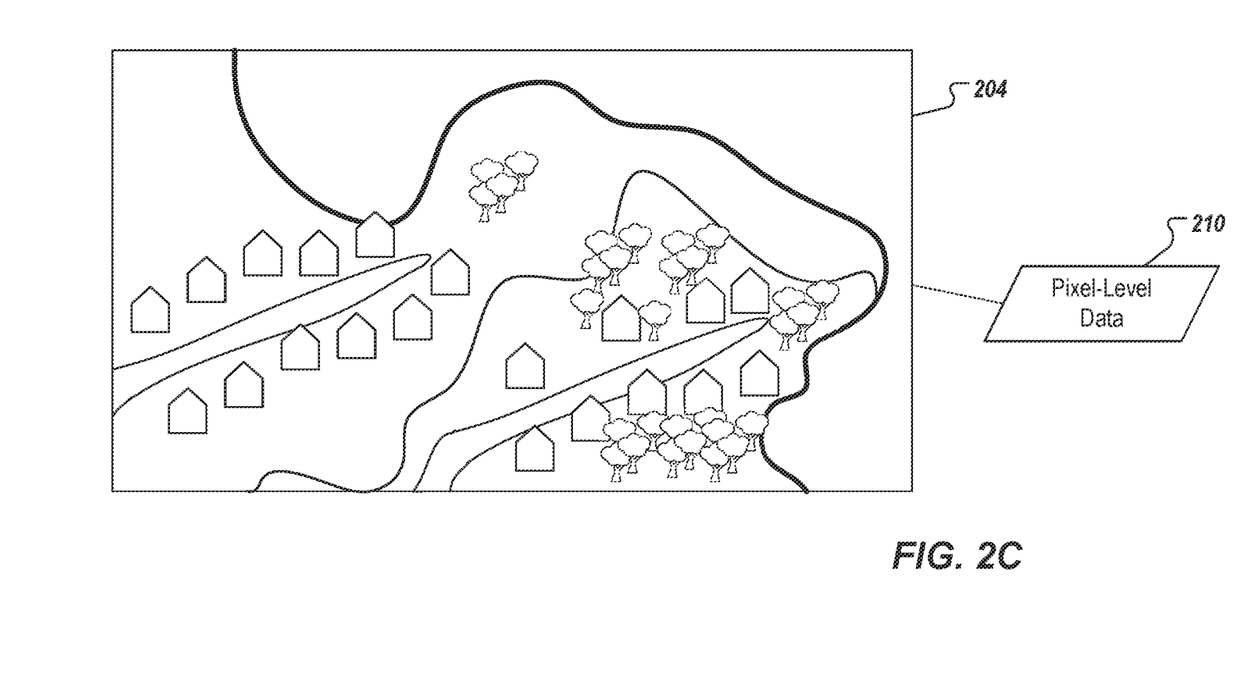

FIGS. 2A-2C depict images 202, 204, 206 of an example property in accordance with implementations of the present disclosure.

With reference to FIG. 2A, the image 200 depicts a parcel and features located within the parcel (e.g., structure, vegetation). As such, the image 200 is provided as a parcel-level image having a first image scale (e.g., 1:100) and a first image resolution (e.g., 10 cm per pixel). The image 200 is associated with pixel-level data 206, which can include a set of properties (e.g., vegetation, humidity, wind speed, etc.) for each pixel (e.g., layers) in the image 200. In some examples, the image 200 and/or the pixel-level data 206 represent street-view imagery or overhead imagery for the parcel. In the example of FIG. 2A, the parcel depicted within the image 200 is a relatively small area (e.g., approximately the size of a single structure and immediate surroundings). As such, the pixel-level data 206 can have a first data density describing the features located on the parcel at a relatively high data density.

With reference to FIG. 2B, the image 202 depicts the parcel and features located within a neighborhood of the parcel (e.g., structures, vegetations). As such, the image 202 is provided as a neighborhood-level image having a second image scale (e.g., 1:2000) and a second image resolution (e.g., 20 m per pixel). The image 202 is associated with pixel-level data 208, which can include a set of properties (e.g., vegetation, humidity, wind speed, etc.) for each pixel (e.g., layers) in the image 202. In some examples, the image 204 and/or the pixel-level data 208 represent a vegetation segmentation map (e.g., tree segmentation map) for the neighborhood. In the example of FIG. 2B, the parcel depicted within the image 202 is a relatively moderately sized area (e.g., a neighborhood around the parcel). As such, the pixel-level data 208 can have a second data density describing the features located in the neighborhood at a relatively moderate data density.

With reference to FIG. 2C, the image 204 depicts the parcel and features located within a landscape that the parcel is located in (e.g., structures, vegetations). As such, the image 204 is provided as a landscape-level image having a third image scale (e.g., 1:20000) and a third image resolution (e.g., 60 m per pixel). The image 204 is associated with pixel-level data 210, which can include a set of properties (e.g., vegetation, humidity, wind speed, etc.) for each pixel (e.g., layers) in the image 204. In some examples, the image 204 and/or the pixel-level data 210 represents elevation maps for the landscape. In the example of FIG. 2C, the parcel depicted within the image 204 is a relatively large area (e.g., a landscape that the parcel is located in). As such, the pixel-level data 210 can have a third data density describing the features located in the landscape at a relatively low data density.

In some implementations, the risk assessment can be provided from the risk assessment system of the present disclosure in response to receiving a request for a risk assessment. In some examples, the request indicates a particular parcel and an adverse event (e.g., a hazard event such as wildfire, flood) that the request is for. In some examples, the particular parcel can be indicated by a street address and/or GPS coordinates. In some implementations, a set of images and sets of pixel-level data can be obtained for the parcel. For example, the set of images and/or the sets of pixel-level data can be obtained from one or more databases by submitting a query to the one or more databases indicating the parcel. In some examples, a parcel-level image can be provided as a street-level image that is received from a user with a request for a risk assessment of the parcel depicted in the parcel-level image. In some examples, the set of images includes a parcel-level image, a neighborhood-level image, and a landscape-level image. In some examples, the sets of pixel-level data include a set of pixel-level data providing feature properties for pixels in the parcel-level data, a set of pixel-level data providing feature properties for pixels in the neighborhood-level data, and a set of pixel-level data providing feature properties for pixels in the landscape-level data.

In some examples, images in the set of images and sets of pixel-level data correspond to a designated time. In some examples, the designated time is a time that the request is received. In some examples, the designated time is a time indicated in the request. In some examples, the images in the set of images and sets of pixel-level data correspond to the designated time, if a respective time of each image and respective times of each set of pixel-level data is within a threshold time of the designated time (e.g., one month, 3 months). That is, the images in the set of images and the sets of pixel-level data should be representative of the parcel, neighborhood, and landscape at the designated time, for which the risk assessment is requested. For example, if the designated time is June, images and/or sets of pixel-level data from December are not representative of the condition (e.g., weather, vegetation) of the parcel, neighborhood, and landscape. Consequently, the risk assessment would be inaccurate. As another example, if the designated time is June, images and/or sets of pixel-level data from June (e.g., of the same year or a previous year) are representative of the condition (e.g., weather, vegetation) of the parcel, neighborhood, and landscape. Consequently, the risk assessment would be accurate.

In some implementations, additional data, such as public records (e.g., construction year, set back, variance, etc.) and other relevant geospatial information (e.g., neighborhood housing density, distances to fire stations/emergency services, distances to major roads, etc.) can be provided for the parcel. In some examples, the additional data can be used to extract features that are relevant for assessing risk to the parcel.

Figure 3:
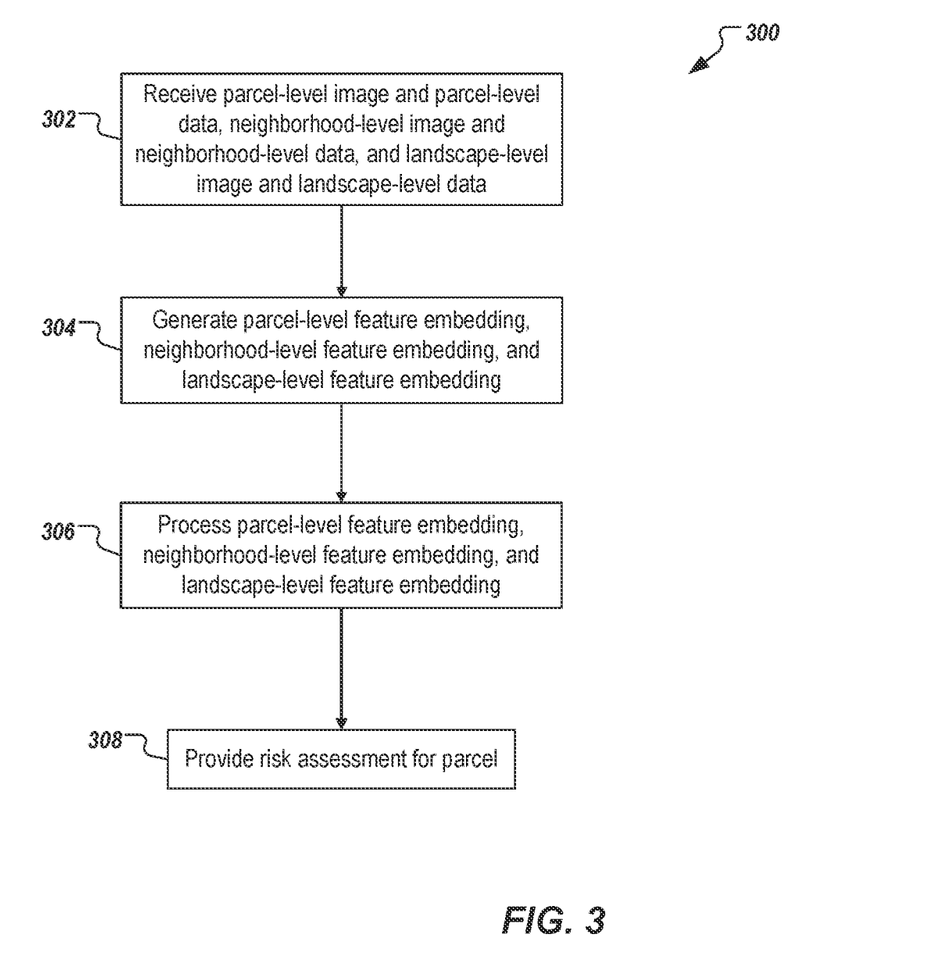
FIG. 3 is a flow diagram of an example process that can be executed in accordance with implementations of the present disclosure.

FIG. 3 is a flow diagram of an example process in accordance with implementations of the present disclosure. Operations of the process 300 can be implemented as instructions stored on one or more computer readable media which may be non-transitory, and execution of the instructions by one or more data processing apparatus can cause the one or more data processing apparatus to perform the operations of the process 300.

Parcel-level image and parcel-level data, neighborhood-level image and neighborhood-level data, and landscape-level image and landscape-level data are received (302). For example, and as described herein, a request can be received that indicates a particular parcel and an adverse event (e.g., a hazard event such as wildfire, flood) that the request is for. In response to the request, set of images and/or the sets of pixel-level data can be obtained from one or more databases by submitting a query to the one or more databases indicating the parcel. In some examples, the query can indicate a designated time that is relevant for the risk assessment. In some examples, a parcel-level image is provided from a user with a request for a risk assessment of the parcel depicted in the parcel-level image.

Parcel-level feature embedding, neighborhood-level feature embedding, and landscape-level feature embedding are generated (304). For example, and as described herein, the parcel-level image (and associated pixel-level data) can be process by a parcel-level ML model, which outputs the parcel-level feature embedding. The parcel-level feature embedding encodes spatial context and resolution at the parcel-level (granular level). As also described herein, the neighborhood-level image (and associated pixel-level data) can be process by a neighborhood-level ML model, which outputs the neighborhood-level feature embedding. The neighborhood-level feature embedding encodes spatial context and resolution at the neighborhood-level (less granular level). As also described herein, the landscape-level image (and associated pixel-level data) can be process by a landscape-level ML model, which outputs the landscape-level feature embedding. The landscape-level feature embedding encodes spatial context and resolution at the landscape-level (least granular level).

The parcel-level feature embedding, the neighborhood-level feature embedding, and the landscape-level feature embedding are processed (306). For example, and as described herein, the parcel-level feature embedding, the neighborhood-level feature embedding, and the landscape-level feature embedding are provided as input to a fusion network, which processes the parcel-level feature embedding, the neighborhood-level feature embedding, and the landscape-level feature embedding collectively.

A risk assessment is provided for the parcel (308). For example, and as described herein, a score is provided that indicates a likelihood that the parcel will be damaged in the adverse event. In some examples, the fusion network provides the score. In some examples, a calibration curve that is fit to a test set and/or validation set of the fusion network during post-training testing and validation is used to determine the score. For example, the calibration curve can be used during inference to convert a relative risk prediction output by the last layer of the fusion network into the score. In some examples, the calibration curve is included in the fusion network.

As described herein, the risk assessment system of the present disclosure provides one or more technical advantages. In one example, the risk assessment system of the present disclosure enables risk assessments to account for features at different scales in a time- and resource-efficient manner improving over traditional risk assessment systems. For example, implementations of the present disclosure provide processor- and memory-efficiencies in both training and inference over traditional risk assessment systems that use techniques such as pyramid networks, which are processor- and memory-intensive. For example, implementations of the present disclosure use separate inputs to separate models. Further, implementations of the present disclosure avoid additional up/down sampling steps that are executed in pyramid networks to adjust input resolution to a common grid.

The term "configured" can be used in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in some cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Data processing apparatus for implementing machine learning models can also include, for example, special-purpose hardware accelerator units for processing common and compute-intensive parts of machine learning training or production (i.e., inference, workloads).

Machine learning models can be implemented and deployed using a machine learning framework (e.g., a TensorFlow framework, a Microsoft Cognitive Toolkit framework, an Apache Singa framework, an Apache MXNet framework).

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more processors, the method comprising:
  receiving a request for a risk assessment for a parcel;
  receiving a set of images for the parcel, the set of images comprising two or more images, each image having (i) an image scale, (ii) an image resolution, and (iii) a set of features of the parcel captured within the image, being different from other images in the set of images;
  processing a first-level image of the set of images having a first image scale and a first image resolution through a first-level machine learning (ML) model to provide a first-level feature embedding, the first-level ML model being trained on a first set of images having the first image scale and the first image resolutions;
  processing a second-level image of the set of images having a second image scale and a second image resolution through a second-level ML model to provide a second-level feature embedding, the second-level ML model being trained on a second set of images having the second image scale and the second image resolution, the second image scale being different from the first image scale, the second image resolution being different from the first image resolution;

determining a risk assessment at least partially by processing each of the first-level feature embedding and a second-level feature embedding through a fusion network; and providing a representation of the risk assessment for display.

2. The method of claim 1, wherein the first-level feature embedding comprises a parcel-level feature embedding that is generated at least partially based on a parcel-level image in the set of images, and the second-level feature embedding comprises one of a neighborhood-level feature embedding that is generated at least partially based on a neighborhood-level image in the set of images and a landscape-level feature embedding that is generated at least partially based on a landscape-level image in the set of images.

3. The method of claim 2, wherein the parcel-level image has the first image scale and the first image resolution, each being greater than the second image scale and the second image resolution of one of the neighborhood-level image and the landscape-level image.

4. The method of claim 1, wherein each image in the set of images represents the parcel within a threshold of time from a designated time associated with the request.

5. The method of claim 1, wherein at least one image in the set of images comprises an overhead view of the parcel and at least one other image in the set of images comprises one of a vegetation segmentation map and an elevation map.

6. The method of claim 1, further comprising providing a third-level feature embedding by processing a third-level image through a third-level ML model, wherein the third-level feature embedding is processed through the fusion network in determining the risk assessment.

7. The method of claim 1, wherein determining the risk assessment comprises converting a relative risk prediction to the risk assessment using a calibration curve.

8. The method of claim 7, wherein the relative risk prediction is output by a last layer of the fusion network.

9. The method of claim 1, wherein the first-level feature embedding is output from a non-final layer of the first-level ML model and the second-level feature embedding is output from a non-final layer of the second-level ML model.

10. The method of claim 1, wherein the first-level feature embedding is further provided by processing a set of first-level pixel data through the first-level ML model, and the second-level feature embedding is further provided by processing a set of second-level pixel data through the second-level ML model.

11. A non-transitory computer storage medium encoded with a computer program, the computer program comprising instructions that when executed by a data processing apparatus cause the data processing apparatus to perform operations comprising:

receiving a request for a risk assessment for a parcel;

receiving a set of images for the parcel, the set of images comprising two or more images, each image having (i) an image scale, (ii) an image resolution, and (iii) a set of features of the parcel captured within the image, being different from other images in the set of images;

processing a first-level image of the set of images having a first image scale and a first image resolution through a first-level machine learning (ML) model to provide a first-level feature embedding, the first-level ML model being trained on a first set of images having the first image scale and the first image resolutions;

processing a second-level image of the set of images having a second image scale and a second image resolution through a second-level ML model to provide a second-level feature embedding, the second-level ML model being trained on a second set of images having the second image scale and the second image resolution, the second image scale being different from the first image scale, the second image resolution being different from the first image resolution;

determining a risk assessment at least partially by processing each of the first-level feature embedding and a second-level feature embedding through a fusion network; and providing a representation of the risk assessment for display.

12. The non-transitory computer storage medium of claim 11, wherein the first-level feature embedding comprises a parcel-level feature embedding that is generated at least partially based on a parcel-level image in the set of images, and the second-level feature embedding comprises one of a neighborhood-level feature embedding that is generated at least partially based on a neighborhood-level image in the set of images and a landscape-level feature embedding that is generated at least partially based on a landscape-level image in the set of images.

13. The non-transitory computer storage medium of claim 12, wherein the parcel-level image has the first image scale and the first image resolution, each being greater than the second image scale and the second image resolution of one of the neighborhood-level image and the landscape-level image.

14. The non-transitory computer storage medium of claim 11, wherein each image in the set of images represents the parcel within a threshold of time from a designated time associated with the request.

15. The non-transitory computer storage medium of claim 11, wherein at least one image in the set of images comprises an overhead view of the parcel and at least one other image in the set of images comprises one of a vegetation segmentation map and an elevation map.

16. The non-transitory computer storage medium of claim 11, wherein operations further comprise providing a third-level feature embedding by processing a third-level image through a third-level ML model, wherein the third-level feature embedding is processed through the fusion network in determining the risk assessment.

17. The non-transitory computer storage medium of claim 11, wherein determining the risk assessment comprises converting a relative risk prediction to the risk assessment using a calibration curve.

18. The non-transitory computer storage medium of claim 17, wherein the relative risk prediction is output by a last layer of the fusion network.

19. The non-transitory computer storage medium of claim 11, wherein the first-level feature embedding is output from a non-final layer of the first-level ML model and the second-level feature embedding is output from a non-final layer of the second-level ML model.

20. The non-transitory computer storage medium of claim 11, wherein the first-level feature embedding is further provided by processing a set of first-level pixel data through the first-level ML model, and the second-level feature embedding is further provided by processing a set of second-level pixel data through the second-level ML model.

21. A system, comprising:
a computing device; and
a computer-readable storage device coupled to the computing device and having instructions stored thereon which, when executed by the computing device, cause the computing device to perform operations comprising:
- receiving a request for a risk assessment for a parcel;
- receiving a set of images for the parcel, the set of images comprising two or more images, each image having (i) an image scale, (ii) an image resolution, and (iii) a set of features of the parcel captured within the image, being different from other images in the set of images;
- processing a first-level image of the set of images having a first image scale and a first image resolution through a first-level machine learning (ML) model to provide a first-level feature embedding, the first-level ML model being trained on a first set of images having the first image scale and the first image resolutions;
- processing a second-level image of the set of images having a second image scale and a second image resolution through a second-level ML model to provide a second-level feature embedding, the second-level ML model being trained on a second set of images having the second image scale and the second image resolution, the second image scale being different from the first image scale, the second image resolution being different from the first image resolution;
- determining a risk assessment at least partially by processing each of the first-level feature embedding and a second-level feature embedding through a fusion network; and
- providing a representation of the risk assessment for display.

22. The system of claim 21, wherein the first-level feature embedding comprises a parcel-level feature embedding that is generated at least partially based on a parcel-level image in the set of images, and the second-level feature embedding comprises one of a neighborhood-level feature embedding that is generated at least partially based on a neighborhood-level image in the set of images and a landscape-level feature embedding that is generated at least partially based on a landscape-level image in the set of images.

23. The system of claim 22, wherein the parcel-level image has the first image scale and the first image resolution, each being greater than the second image scale and the second image resolution of one of the neighborhood-level image and the landscape-level image.

24. The system of claim 21, wherein each image in the set of images represents the parcel within a threshold of time from a designated time associated with the request.

25. The system of claim 21, wherein at least one image in the set of images comprises an overhead view of the parcel and at least one other image in the set of images comprises one of a vegetation segmentation map and an elevation map.

26. The system of claim 21, wherein operations further comprise providing a third-level feature embedding by processing a third-level image through a third-level ML model, wherein the third-level feature embedding is processed through the fusion network in determining the risk assessment.

27. The system of claim 21, wherein determining the risk assessment comprises converting a relative risk prediction to the risk assessment using a calibration curve.

28. The system of claim 27, wherein the relative risk prediction is output by a last layer of the fusion network.

29. The system of claim 21, wherein the first-level feature embedding is output from a non-final layer of the first-level ML model and the second-level feature embedding is output from a non-final layer of the second-level ML model.

30. The system of claim 21, wherein the first-level feature embedding is further provided by processing a set of first-level pixel data through the first-level ML model, and the second-level feature embedding is further provided by processing a set of second-level pixel data through the second-level ML model.

* * * * *